March 5, 1935.  E. C. COOK  1,993,648
AUTOMOBILE TURNTABLE
Filed Sept. 7, 1932  3 Sheets-Sheet 1

E. C. Cook
Inventor

By C. A. Snow & Co.
Attorneys

March 5, 1935. E. C. COOK 1,993,648
AUTOMOBILE TURNTABLE
Filed Sept. 7, 1932 3 Sheets-Sheet 2
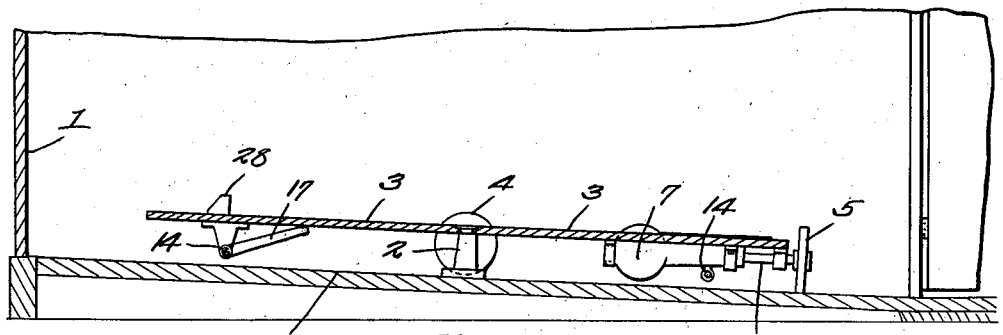
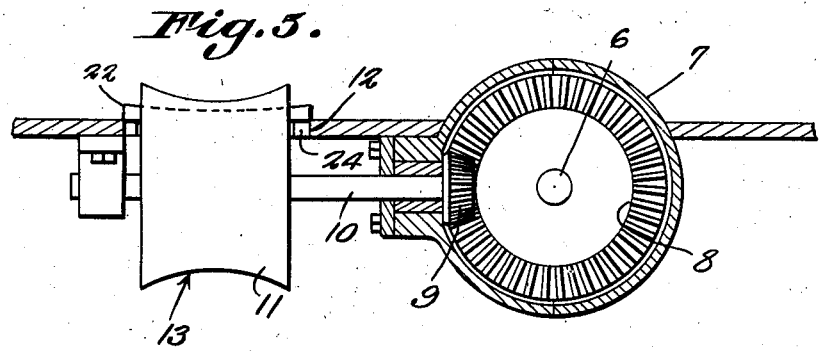
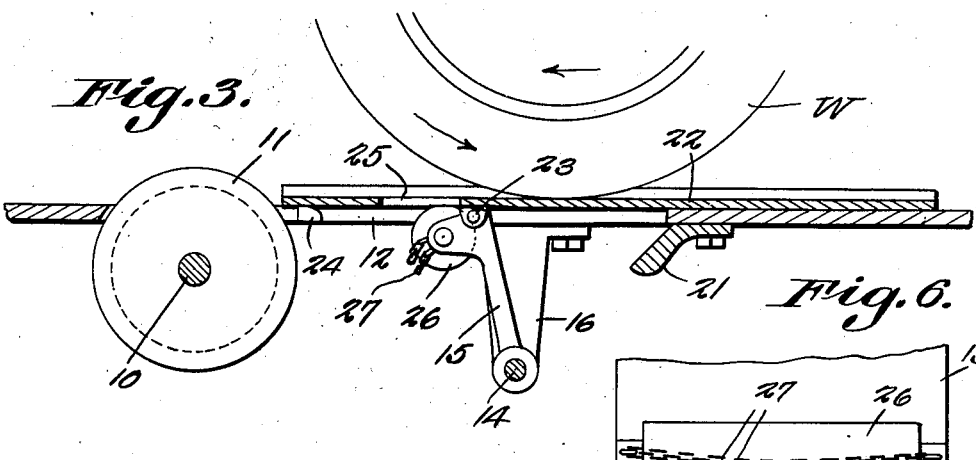
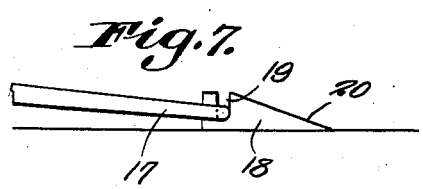
E. C. Cook Inventor March 5, 1935. E. C. COOK 1,993,648
AUTOMOBILE TURNTABLE
Filed Sept. 7, 1932 3 Sheets-Sheet 3

E. C. Cook Inventor
By C A Snow & Co.
Attorneys.

Patented Mar. 5, 1935

1,993,648

UNITED STATES PATENT OFFICE 1,993,648

AUTOMOBILE TURNTABLE

Egbert C. Cook, Los Angeles, Calif.

Application September 7, 1932, Serial No. 632,053

12 Claims. (Cl. 104—44)

This invention relates to a turntable and is designed for turning automobiles in garages, drives, etc. where there is not enough room to permit the vehicle to be turned in the usual way.

One of the objects is to provide a device of this character which can be installed readily, and will be operated by power from the automobile supported thereon.

A further object is to provide simple and efficient means for transmitting motion from the vehicle to the turntable said means being of such character as not to interfere with the movement of the vehicle onto or off of the turntable.

A further object is to provide a turntable which can be used with either one or two automobiles.

With the foregoing and other objects in view which will appear as the description proceeds, the invention resides in certain novel details of construction and combinations of parts which will be hereinafter more fully described and pointed out in the claims, it being understood that changes may be made in the construction and arrangement of the parts without departing from the spirit of the invention as claimed.

In the accompanying drawings the preferred forms of the invention have been shown.

In said drawings

Figure 2 is a section on line 2—2, Figure 1.

Figure 3 is an enlarged section through the turntable on the line 3—3 of Figure 1, showing the normal positions of the adjacent working parts while a drive wheel of an automobile is moving into position on the structure.

Figure 5 is a view partly in section and partly in elevation of said driving mechanism.

Figure 6 is a detail view of the roller and its traction chains.

Figure 7 is a side elevation of the locking finger and its keeper.

Figure 1:
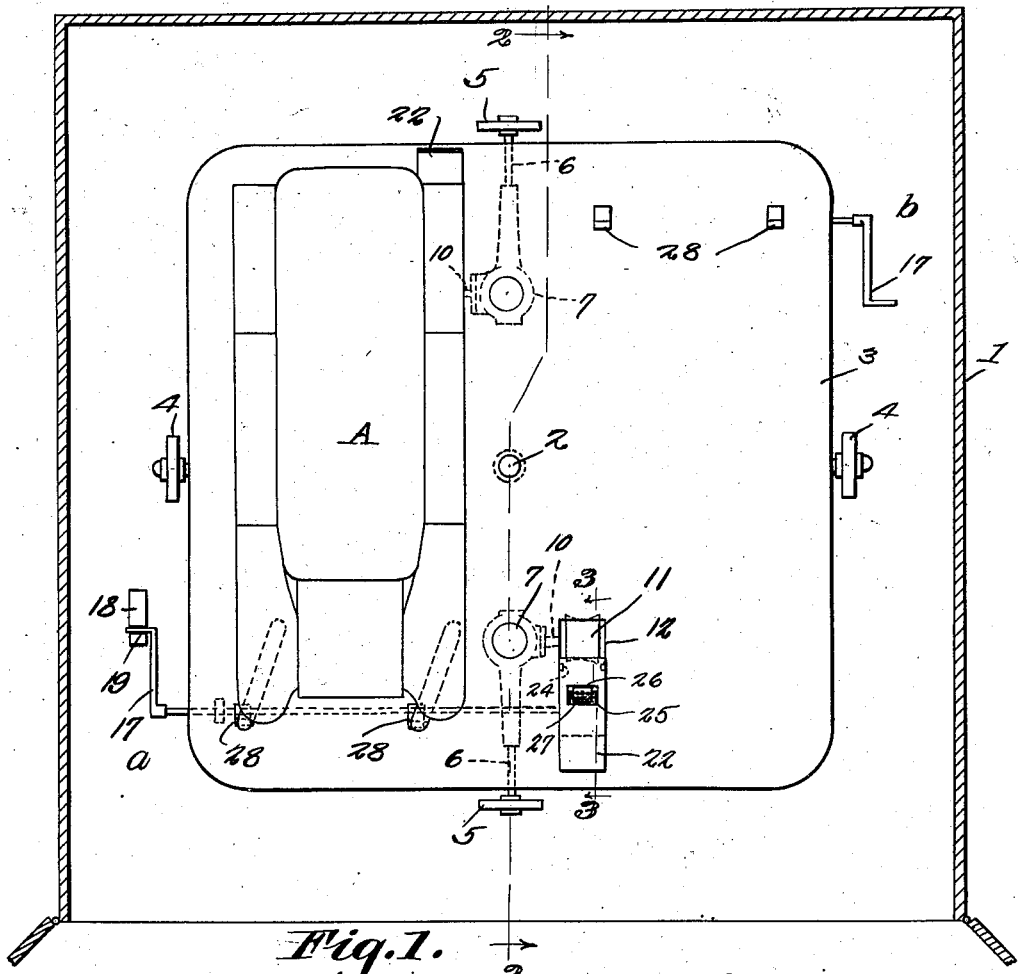
Figure 1 is a plan view of the device supporting a turned vehicle within a garage shown in section.

Referring to the figures by characters of reference, 1 designates a garage structure having a central pivot post 2 on which is mounted the platform 3 of a turntable so proportioned as to be capable of rotating within the garage.

Small wheels 4 can support the sides of the platform at their centers and at the centers of the ends of the platform can be located small wheels 5. All of the wheels can be made of the hub portions of discarded automobile wheels or they can be specially constructed. The wheels 5 can be attached to axle shafts 6 of discarded motor vehicles, these shafts extending from differential housings 7 containing gears 8 and 9 whereby motion can be transmitted to shafts 6 and wheels 5 from short transverse shafts 10 located beneath and carried by the platform. It will be noted from the foregoing that old automobile parts can thus be used efficiently as a means for supporting and propelling the platform. Obviously, however, the parts can be new and specially constructed if so desired.

Shafts 10 are located near the respective ends of the platform but at opposite sides respectively of the longitudinal center of the platform. Each of these shafts has a pulley 11 secured to it and projecting upwardly through an opening 12 in the platform. Each pulley is located where it can be engaged by one rear wheel W of an automobile A when brought to position on the platform. The periphery of the wheel preferably is concaved or grooved as shown at 13.

Figure 4:
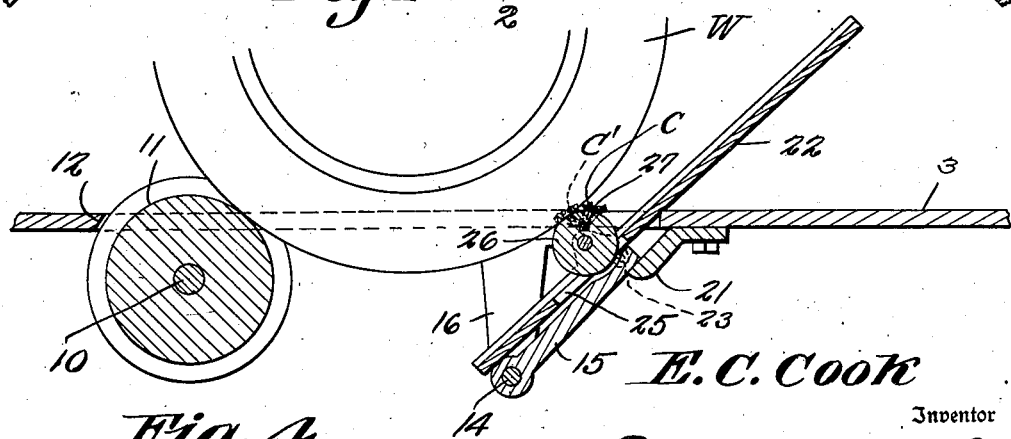
Figure 4 is a similar view showing said driving wheel in operative position relative to the mechanism of the turntable.

Each opening 12 has a shaft 14 extended thereacross near that end remote from pulley 11 and said shaft is extended oppositely to shaft 10 of said pulley so as to project beyond the far side of the platform 3. That portion of shaft 14 under slot 12 has an arm 15 secured to it. As shaft 14 is supported below the platform 3 by hangers 16 it is possible for the arm 15 to swing thereover past the dead center when the shaft is rotated. This will be apparent by comparing Figures 3 and 4 showing two positions of the arm.

The outer or projecting end of shaft 14 has a crank or latch arm 17 adapted, when near the door opening of the garage, to be seated in a keeper 18 having a notch 19 for the reception of the latch arm. The top of the keeper can be inclined as at 20 to guide the latch arm 17 upwardly to the notch when the platform is rotated to one of its positions.

When the latch arm 17 is in engagement with its keeper it acts as a weight to support the arm 15 in the position shown in Figure 3. In its other extreme position, as shown in Figure 4, the arm 15 is supported by a stop 21.

A bridging plate 22 is pivotally mounted at 23 on the arm 15 and when said arm is raised, as in Figure 3, the plate is supported flat on platform 3 and also on small supporting lugs 24 in opening 12 near pulley 11.

A slot 25 is provided in the bridging plate 22 near the pivot 23 and is so proportioned that when the plate 2 is tilted or folded onto arm 15, as hereinafter explained, it will receive a roller 26 which is journaled on arm 15. Traction chains 27 or the like are anchored to the arm 15 and extend loosely along the roller 26 as shown in Fig. 6.

Normally the platform is located as in Figure 1 with one latch lever 17 engaging the keeper. An automobile A is driven onto the right hand portion of the platform at which time the left front wheel will be pushed over the bridging plate 22 nearest the door opening, supported as in Figure 3 and thence over the pulley 11 and along the platform until it comes against or close to a chock or stop 28 one of which is provided for each front wheel if so desired. As the front wheel reaches the position described one of the rear drive wheels W passes over the plate 22 and comes against wheel 11. As said wheel 11 will rotate under the driving action of wheel W the traction will be destroyed and the tread of wheel W will slide plate 22 backwardly off of lugs 24. This will swing arm 15 back past its dead center and allow the plate to swing downwardly onto arm 15 which, in turn, will swing against stop 21. See Figure 4. This action will cause roller 26 to project through slot 25 where it will engage and act as a roller support for wheel W. Thus the wheel W can rotate while mounted on pulley 11 and roller 26 and such rotation will drive pulley 11.

When arm 15 is shifted against stop 21 by an automobile entering at the right of Fig. 1 it rotates the shaft 14 nearest the door opening so as to lift the latch arm 17 at station $a$ (Fig. 1). Thus said arm 17 will become disengaged from its keeper 18. When the pulley 11 is rotated by the automobile wheel as before explained motion will be transmitted therefrom through its shaft 10, gears 9 and 8 and shaft 6 to front wheel 5. This will cause the platform, with the automobile thereon, to rotate about pivot 2 and bring the automobile to the position shown in Fig. 1. As the platform completes this one-half rotation the latch 17 which had been lifted at station $a$ and which is held in raised position by the automobile, will be brought to station $b$ (Fig. 1) while the other or unrestrained latch 17 which is free and in normal or depending position, will move against the keeper 18 at station $a$ and stop the rotation of the platform, it being understood of course that the actuation of the pulley 11 by the vehicle is to be stopped at that time.

With the automobile in its reversed position as in Fig. 1, the latch lever 17 at station $a$ in holding position and the automobile-controlled latch lever 17 at station $b$ raised, the automobile is ready to be driven from the turntable whenever desired. This can be done either by driving the automobile straight forward or by backing it slightly and then driving forward. It is to be understood that the pulley 11 engaged by a wheel of the automobile is now at the back of the turntable and the wheel 5 geared to said roller is also at the back of the turntable in frictional contact with the floor. As this wheel supports the weight of the automobile it cannot rotate unless the platform is moved about its pivot 2. As this is prevented by the forward latch lever 17 at station $a$ it will be apparent that pulley 11 geared to wheel 5 and supporting the automobile cannot rotate. Consequently by shifting the front wheels of the automobile laterally so as to avoid the chocks 28 the automobile can be driven forward because the held, engaged pulley 11 will afford the necessary traction. This traction will be further facilitated by the backward thrust of the tread portion of the wheel tire on the chains 27 which occupy the upper crotch C formed between the tire and roller 26.

As soon as the vehicle drives forwardly on platform 3 and away from slot 12 the lowered plate 22 and arm 15 and the raised latch arm 17 at the back of the platform will be released. Thus latch arm 17, acting as a weight, will swing arm 15 upwardly and forwardly from the position shown in Fig. 4 to the position shown in Fig. 3, at the same time dragging the plate 22 to position over the slot 12. Thus the parts are reset and can thereafter operate once more in the manner already described.

Another way of removing the vehicle from the platform is by backing it from the position shown in Figures 1 and 4. As before explained when the parts are located as in Fig. 4 the chains 27 which are fastened at their ends and cannot rotate with roller 26, lie within the upper crotch C where they contact with the thread of the wheel tire. When the rotation of the wheel is reversed so as to back, pulley 11 cannot revolve for the reasons already explained. Thus the wheel will be forced to mount roller 26 and chains 27. As these chains are held at their ends they can only move downwardly to position C' where they will be anchored and provide the traction necessary to allow the wheel to travel over the roller 26 and onto the raised end portion of platform 22. Thus the platform will be swung to horizontal position, this movement being facilitated by the weight of latch lever 17 connected to said plate. As the wheel backs off of the plate 22 lever 17 will restore the plate to its normal position as in Figure 3 and the vehicle, having been turned aside slightly, can then be driven forwardly over and off of the platform without touching plate 22.

While the device has been shown inside a garage it is to be understood that it can be located in a roadway. Furthermore instead of using a platform for holding two cars it can be made single simply by removing one half of the structure, leaving the pivot at the center of one side, as will be obvious.

Figure 8:
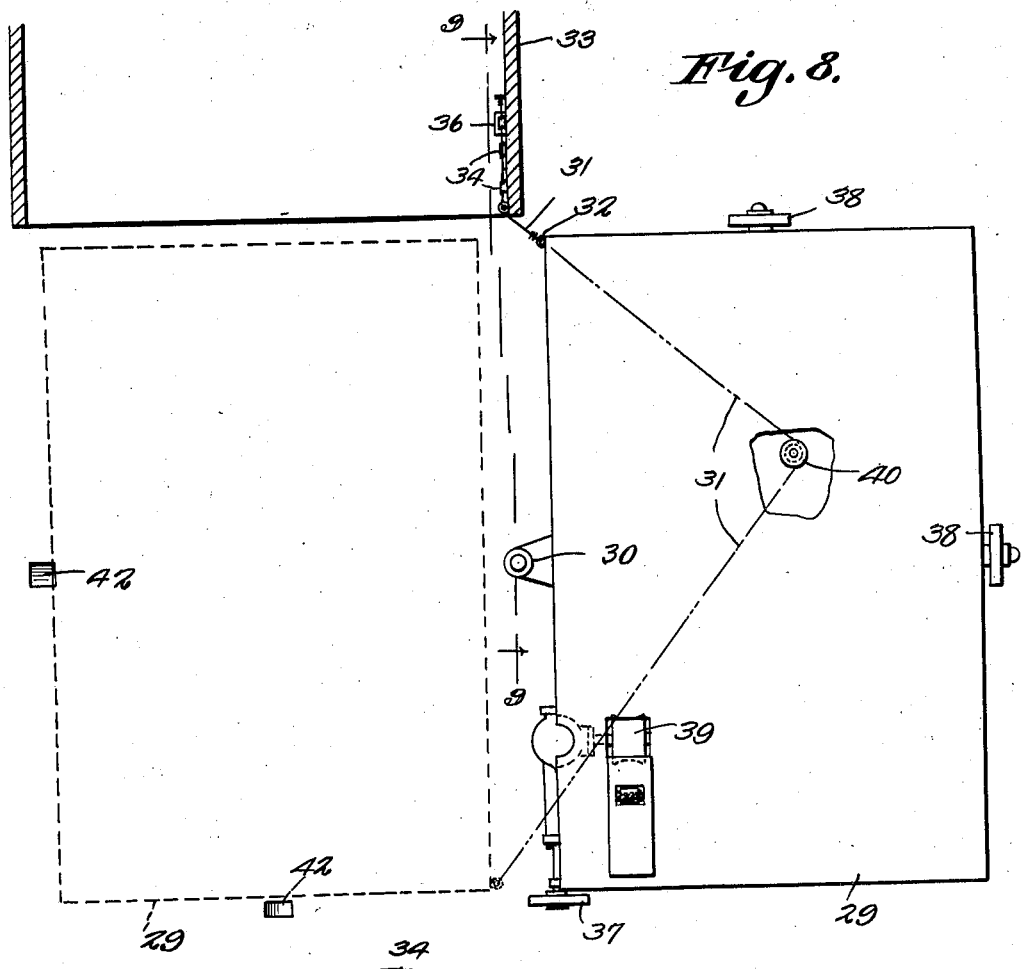
Figure 8 is a plan view of a modified form of turntable located outside of a garage and provided with weighted controlling mechanism.
Figure 9:
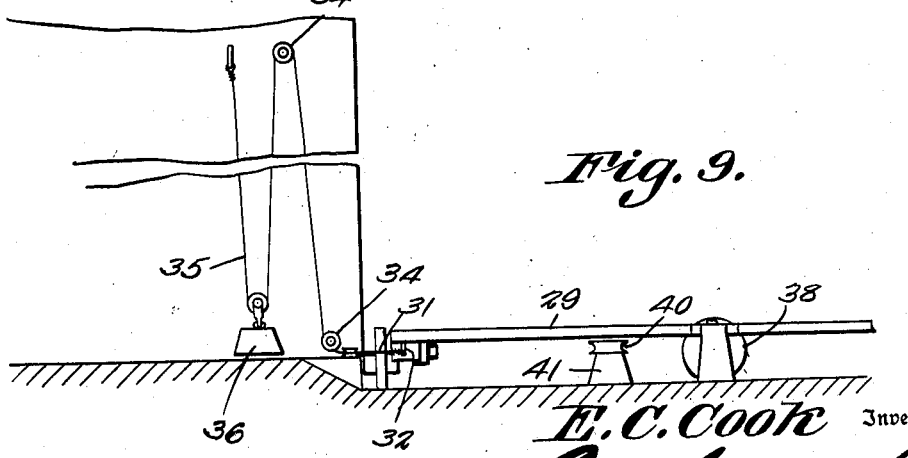
Figure 9 is a section on line 9—9, Figure 8.

Should a single turntable be used outside of a single garage, as shown at 29 in Figures 8 and 9, a means could be provided for returning it to normal position after an automobile has been turned therewith and backed into the garage. In this modified structure the platform 29 is pivoted at the center of one side, as at 30 and has a cable 31 or the like connected to one corner, as at 32, and to the garage or other fixed structure 33. The cable is guided, in the form illustrated, by pulleys 34, to provide a depending loop 35 supporting a shiftable weight 36. This weight is adapted to exert a constant pull upon the platform so as to maintain it normally in the position shown by full lines.

The platform is equipped with supporting wheels 37 and 38, the wheel 37 being adapted for actuation by a pulley 39 arranged and operated like the pulley 11 heretofore described.

When an automobile is positioned on the platform while located as shown in Figure 8, it can be operated to swing the platform outwardly and laterally into position in front of the garage, as shown by dotted lines. This will cause the weight to be raised and will bring the cable into engagement with a guide pulley 40 on a post 41, as shown.

The wheels 38 will move into depressions 42 in the pavement and the vehicle, which has been turned in a half circle with the platform, can be backed off of the platform and into the garage. When the platform is released the weight actuated cable will pull it back to normal position as shown in full lines in Figure 8.

Obviously various modifications of the device can be made within the scope of the invention.

If desired, and as shown in Figure 2, the floor or pavement 43 under the platform can be inclined toward the door opening so that when a car is to be taken from the garage it can gravitate along the platform and thus give sufficient momentum ordinarily to start the engine.

What is claimed is:

1. An automobile turntable including a pivoted platform, supporting wheels, a pulley on the platform operatively connected to one of the wheels, means on the platform for supporting a vehicle wheel in proximity to the pulley, a support therefor, and a roller, said means being shiftable off of said support by the vehicle wheel when in contact with the pulley thereby to lower the wheel onto the roller for support solely by the pulley and roller.

2. An automobile turntable including a pivoted platform, supporting wheels, a pulley on the platform operatively connected to one of the wheels, means on the platform for supporting a vehicle wheel in proximity to the pulley, a support therefor, and a roller, said means being shiftable off of said support by the vehicle wheel when in contact with the pulley thereby to lower the wheel onto the roller for support solely by the pulley and roller, a latch for the platform, and means operated by the wheel supporting means when shifted by the vehicle wheel, for releasing the latch.

3. An automobile turntable including a pivoted platform having an opening, a wheel constituting a support for the platform, a pulley operatively connected to the wheel, a bridging member movably mounted on the platform for supporting a vehicle wheel over the opening in engagement with the pulley, means for supporting the member, said vehicle wheel constituting means for kicking the member off of its support when the wheel engages the pulley, a roller, and means actuated by said movement of the member for bringing the roller into position for cooperating with the pulley to support the vehicle wheel.

4. An automobile turntable including a pivoted platform having an opening, a wheel constituting a support for the platform, a pulley operatively connected to the wheel, a bridging member movably mounted on the platform for supporting a vehicle wheel over the opening in engagement with the pulley, means for supporting the member, said vehicle wheel constituting means for kicking the member off of its support when the wheel engages the pulley, a roller, and means actuated by said movement of the member for bringing the roller into position for cooperating with the pulley to support the vehicle wheel, means for holding the platform against pivoted movement, and means operated by said movement of the bridging member for releasing the holding means.

5. An automobile turntable including a pivoted platform having an opening, a wheel constituting a support for the platform, a pulley operatively connected to the wheel, a bridging member movably mounted on the platform for supporting a vehicle wheel over the opening in engagement with the pulley, means for supporting the member, said vehicle wheel constituting means for kicking the member off of its support when the wheel engages the pulley, there being an opening in the bridging member, an arm connected to the member, a roller on the arm normally below the bridging member and adapted to extend through the opening in said member when the member is released from its support, thereby to engage and support the vehicle wheel for free rotation on the pulley.

6. An automobile turntable including a pivoted platform having an opening, a wheel constituting a support for the platform, a pulley operatively connected to the wheel, a bridging member movably mounted on the platform for supporting a vehicle wheel over the opening in engagement with the pulley, means for supporting the member, said vehicle wheel constituting means for kicking the member off of its support when the wheel engages the pulley, there being an opening in the bridging member, an arm connected to the member, a roller on the arm normally below the bridging member and adapted to extend through the opening in said member when the member is released from its support, thereby to engage and support the vehicle wheel for free rotation on the pulley, and flexible traction means cooperating with the roller for engagement by the vehicle wheel when rotated in the opposite direction.

7. An automobile turntable including a pivoted platform having an opening, a wheel constituting a support for the platform, a pulley operatively connected to the wheel, a bridging member movably mounted on the platform for supporting a vehicle wheel over the opening in engagement with the pulley, means for supporting the member, said vehicle wheel constituting means for kicking the member off of its support when the wheel engages the pulley, there being an opening in the bridging member, an arm connected to the member, a roller on the arm normally below the bridging member and adapted to extend through the opening in said member when the member is released from its support, thereby to engage and support the vehicle wheel for free rotation on the pulley and a platform latch connected to and operated by the arm.

8. An automobile turntable including a pivoted platform having an opening, a platform supporting wheel, a pulley in the opening, a bridging member slidably and tiltably mounted on the platform, means for supporting it over the opening, said member being shiftable off of its support by the kicking action of a rotating vehicle wheel resting on the member and pulley, thereby to release and tilt the member to lower the vehicle wheel into the opening, a roller and means operated by the tilting of the member for moving the roller into engagement with the vehicle wheel thereby to support said wheel solely on the pulley and roller.

9. An automobile turntable including a pivoted platform having an opening, a platform supporting wheel, a pulley in the opening, a bridging member slidably and tiltably mounted on the platform, means for supporting it over the opening, said member being shiftable off of its support by the kicking action of a rotating vehicle wheel resting on the member and pulley, thereby to release and tilt the member to lower the vehicle wheel into the opening, a roller and means operated by the tilting of the member for moving the roller into engagement with the vehicle wheel thereby to support said wheel solely on the pulley and roller, a latch for the platform, and means operated by the sliding and tilting action of the bridging member for operating the latch to release the platform.

10. An automobile turntable including a pivoted platform having an opening, a platform supporting wheel, a pulley in the opening, a bridging member slidably and tiltably mounted on the platform, means for supporting it over the opening, said member being shiftable off of its support by the kicking action of a rotating vehicle wheel resting on the member and pulley, thereby to release and tilt the member to lower the vehicle wheel into the opening, a roller and means operated by the tilting of the member for moving the roller into engagement with the vehicle wheel thereby to support said wheel solely on the pulley and roller, and flexible means cooperating with the roller for engagement by the vehicle wheel when rotated thereby to provide traction for the wheel when pulling away from the pulley.

11. An automobile turntable including a pivoted platform having an opening, a pulley therein, a bridging member normally supported across the opening for guiding a vehicle wheel to the pulley, said member being slidable and tiltable by the wheel when the wheel is in rotating engagement with the pulley, thereby to lower the wheel, a roller adapted to be engaged by the lowered wheel for cooperation with the pulley to permit free rotation of the wheel, and flexible means cooperating with the roller to provide traction for the wheel when rotated in the opposite direction to tilt and slide the bridging member back to its initial position.

12. An automobile turntable including a pivoted platform, supporting wheels, a pulley on the platform operatively connected to one of the wheels, means on the platform for guiding a vehicle wheel to the pulley, a support therefor, and a roller, said means being shiftable off of said support by the vehicle wheel when in contact with the pulley thereby to lower the wheel onto the roller for support solely by the pulley and roller, thereby to drive the pulley and turn the platform about its pivot, and means for returning the platform to its initial position when relieved from the weight of a vehicle.

EGBERT C. COOK.